US011216346B2

(12) United States Patent
Chavan et al.

(10) Patent No.: US 11,216,346 B2
(45) Date of Patent: Jan. 4, 2022

(54) COORDINATED REPLICATION OF HETEROGENEOUS DATABASE STORES

(71) Applicant: SAP SE, Walldorf (DE)

(72) Inventors: Mahendra Chavan, Pune (IN); Reiner Singer, Schriesheim (DE); Markus Behrens, Frankfurt (DE); John Smirnios, Kitchener (DE); Anant Agarwal, San Francisco, CA (US)

(73) Assignee: SAP SE, Walldorf (DE)

( * ) Notice: Subject to any disclaimer, the term of this patent is extended or adjusted under 35 U.S.C. 154(b) by 425 days.

(21) Appl. No.: 15/877,074

(22) Filed: Jan. 22, 2018

(65) Prior Publication Data

US 2019/0155705 A1    May 23, 2019

(30) Foreign Application Priority Data

Nov. 20, 2017  (IN) .............................. 201741041452

(51) Int. Cl.
| | | |
|---|---|---|
| *G06F 16/20* | (2019.01) | |
| *G06F 11/20* | (2006.01) | |
| *G06F 16/23* | (2019.01) | |
| *G06F 16/27* | (2019.01) | |

(52) U.S. Cl.
CPC .......... *G06F 11/2023* (2013.01); *G06F 16/23* (2019.01); *G06F 16/2308* (2019.01); *G06F 16/273* (2019.01); *G06F 16/275* (2019.01)

(58) Field of Classification Search
None
See application file for complete search history.

(56) References Cited

U.S. PATENT DOCUMENTS

| 8,589,449 | B2 * | 11/2013 | Kaplan | G06F 16/164 707/803 |
|---|---|---|---|---|
| 2007/0174697 | A1 * | 7/2007 | Saridakis | G06F 11/1471 714/19 |
| 2008/0228834 | A1 * | 9/2008 | Burchall | G06F 11/1471 |
| 2012/0221521 | A1 * | 8/2012 | Chiu | G06F 11/3485 707/622 |
| 2015/0254298 | A1 * | 9/2015 | Bourbonnais | G06F 16/2282 707/610 |
| 2016/0077910 | A1 * | 3/2016 | Dev | G06F 11/34 714/4.3 |
| 2016/0086097 | A1 * | 3/2016 | Zhang | G06N 20/00 706/12 |

* cited by examiner

*Primary Examiner* — Jau Shya Meng
(74) *Attorney, Agent, or Firm* — Sterne, Kessler, Goldstein & Fox P.L.L.C.

(57) ABSTRACT

Disclosed herein are system, method, and computer program product embodiments for coordinated replication of heterogeneous database stores. An embodiment operates by determining a synchronization point based on a commit log of a primary data center. A current log position of each of a plurality of secondary slave servers associated with a secondary master server of a secondary data center is requested. It is determined that the current log position of at least one of the secondary slave servers does not correspond to the logged position of a corresponding primary slave server relative to the synchronization point. An update indicating that the current log position of each of the secondary slave servers corresponds to the logged position of each of the relative corresponding primary slave servers is received. A replay of each of the secondary slave servers up to the synchronization point is initiated.

20 Claims, 5 Drawing Sheets

COORDINATED REPLICATION OF HETEROGENEOUS DATABASE STORES

CROSS REFERENCE TO RELATED APPLICATIONS

This application claims the benefit of and priority to Indian Provisional Patent Application No. 201741041452, by Chavan, et al., "Coordinated Replication of Heterogeneous Database Stores", filed Nov. 20, 2017, which is hereby incorporated by reference in its entirety.

BACKGROUND

Generally speaking, replication is used to provide redundancy for a computing system. In the event something happens that renders the primary computing system inoperable, the replication or secondary computing system can continue the operations of the primary computing system. For a replication system to be effective, it must maintain a backup or copy of the primary computing system to as recent a time as possible. If the primary computing system includes multiple computing devices, then each primary computing device must be replicated in the event of failure of any or all of the primary computing devices.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for coordinated replication of heterogeneous database stores.

Figure 1:
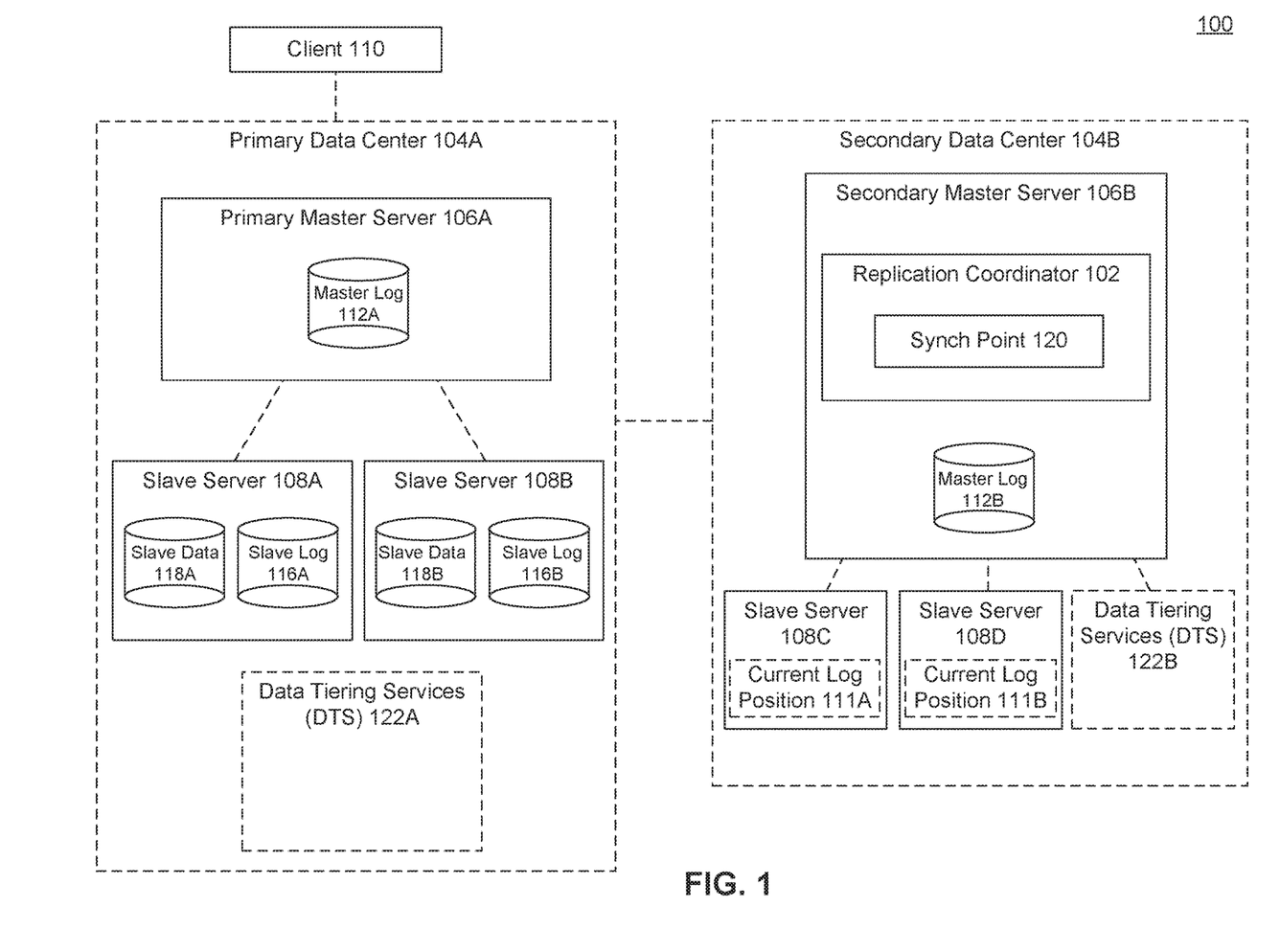
FIG. 1 is a block diagram illustrating examples of coordinated replication of heterogeneous database stores, according to some embodiments.

FIG. 1 is a block diagram 100 illustrating coordinated replication of heterogeneous database stores, according to some embodiments. A replication coordinator 102 may coordinate the replication of a primary data center 104A within a secondary data center 104B.

Data centers 104 may include any grouping of one or more computing devices that are communicatively coupled and configured to provide computing services to one or more clients 110, or to perform one or more tasks. The computing devices may include desktop computers, laptops, cell phones, tablets, wearables, appliances, Internet of Things (IoT) devices, servers (including web and database), and any other computing devices. In an embodiment, primary data center 104A may be a live or active computing system (that is, actively handling and processing requests from clients 110), and secondary data center 104B may be a replication, copy, or backup version of primary data center 104A. A replication coordinator 102 may prepare secondary data center 104B to take over some or all of the responsibilities of the devices of primary data center 104A in the event of failure or other unavailability of some or all of primary data center 104A.

Primary data center 104A may include a number of computing devices that may be coordinated or otherwise working together to fulfill requests received from one or more clients 110. Requests may include requests for data processing services, such as reading, writing, deleting, modifying, or otherwise accessing data. The transactions performed by devices of primary data center 104A may include distributed transactions, and may include retrieving and processing data associated with client requests.

In an embodiment, primary data center 104A may include a primary master server 106A and multiple slave servers 108A, 108B. Primary master server 106A may include a computing device that is configured to coordinate the actions of one or more slave servers 108 that may be processing portions of one or more distributed transactions. In an embodiment, primary master server 106A may receive communications or commands from a client machine 110 and may distribute corresponding transactions (including portions thereof for performance by slave servers 108. Slave servers 108 may retrieve and process data or perform other transactions as requested by or received from primary master server 106A. Upon completion of their designated transactions, slave servers 108 (which may be operating in parallel) may periodically provide status updates or return their results to master server 106. In an embodiment, a slave server 108 may operate as its own master for one or more other slave servers (not shown).

Primary master server 106A may coordinate or combine the responses received from slave servers 108, and deliver responses to clients 110 or otherwise perform requested client actions. While just a single client 110 is shown in the example of FIG. 1, in practice primary master server 106A may simultaneously be receiving, processing (in parallel), and responding to multiple client requests from multiple clients 110. In another embodiment, primary data center 104A may include multiple primary master servers 106A, and each slave server 108A, 108B may be operating as its own primary master server to one or more additional slave servers (not shown). Distributing transactions amongst multiple slave servers 108 may enable primary data center 104A to increase processing throughput via the parallel execution of transactions by the various computing devices or servers 106, 108.

Although only two slave servers 108 are shown in primary data center 104A and secondary data center 104B, it is understood that any number of and combinations of slave servers 108 may exist in either or both data centers 104. Also, each slave server 108 may operate as a master server to one or more other slave servers (not shown) in a multi-tiered environment. A slave server's operation as a master server to other slave servers may be abstracted or hidden from the tiered master server above it, which may be requesting the status of transactions or log transfers as described herein.

Although servers 106A, 108A, 108B are shown as being separate computing devices, in other embodiments the servers 106A, 108A, 108B may include configured portions or partitions of a single or multiple computing devices. Also, a server may include any computing device such as a desktop, laptop, mobile phone, tablets, wearables, appliances, IoT devices, web server, database server, and/or other computing device that is configured to operate as described herein. In an embodiment, slave servers 108 may include or otherwise be communicatively coupled to relational and/or column-oriented database stores (which may store corresponding slave data 118).

Secondary data center 104B may be a replication data center or environment that includes similarly configured devices 106B, 108C, 108D as the corresponding devices shown as being part of primary data center 104A. As such, secondary data center 104B may include a corresponding secondary master server 106B and corresponding slave servers 108C, 108D that are configured to perform similar functions and store or otherwise have access to copies of the data 118 accessible to slave servers 108A, 108B in primary data center 104A.

Replication coordinator 102 may coordinate the replication of the various devices 106A, 108A, 108B, 122A of primary data center 104A with the corresponding devices 106B, 108C, 108D, 122B of secondary data center 104B. Replication of the devices may include copying or replicating the data stored by and/or transactions performed by the devices of primary data center 104A onto the corresponding devices of secondary data center 104B, which may include the manner in which the data is stored (as described with regard to DTS 122 below).

Replication may enable any of the devices of secondary data center 104B to takeover for any failed or unavailable device of primary data center 104A. The replication services provided by replication coordinator 102 may also enable secondary data center 104B to takeover for all the devices of primary data center 104A. For example, a failure or unavailability of primary master server 106A may cause secondary master server 106B to takeover for primary master server 106A, and for slave servers 108C, 108D, 122B to takeover for slave servers 108A, 108B, 122A.

In an embodiment, the replication process may include an initialization of devices with data 118A, 118B from the devices 108A, 108B of primary data center 104A onto the corresponding devices 108C, 108D of secondary data center 104B. In an embodiment, primary master server 106A may have its own data that is replicated to secondary master server 106B. However, the data being replicated may not be static and may be changed during the course of operations (receiving and responding to requests from client 110). Data may be added, removed, or otherwise modified.

The data changes or transactions may be recorded by e various devices in logs 112A, 116A, 116B. Logs 112A, 116A, 116B may be transaction logs that indicate which data was modified, what transactions were performed on the data, and an ordering or timing of the transactions (relative to one another). For example, logs 112A, 116A, 116B may include a timestamp (date/time) of different transactions, or may identify transactions based on a local transaction identifier or incremental transaction count (e.g., T1, T2, T3 . . . ).

As part of the replication process, servers 106A, 108A, 1088 may transmit logs 112A, 116A, 116B (or portions thereof) to the corresponding replication devices 106B, 108C, 108D of secondary (replication) data center 104B. In an embodiment, DTS 122A may transmit logs or log portions to DTS 122B in a similar manner. Transmitting logs between devices may consume less bandwidth or resources relative to sending the actual copies of changed data.

The transfer of logs from the devices of data center 104A to the corresponding devices of data center 104B may occur with different types of synchronization in different embodiments. In embodiments, logs may be transferred or transmitted synchronously or asynchronously.

For example, in a synchronous transfer, the primary device may send a log (or portion thereof) to a secondary device, and wait until an acknowledgement is received from the secondary device that the redo log buffers synchronously. The acknowledgement may indicate that the secondary device has received and/or replayed the log (e.g., having updated corresponding copies of the data from secondary data center 104B). In an embodiment, the primary device may wait or pause processing any additional transactions until the acknowledgement is received. As the distance between the devices of data centers 104A and 104B increases, the delays caused through synchronous transfers increases.

As noted above, the transfer of log data may also occur asynchronously. For example, a primary device may send log data to a secondary device without waiting for the acknowledgement message. For example, in the system 100, replication coordinator 102 may guarantee transactional consistency across system services at takeover time.

In an embodiment, the various devices of primary data center 104A may (asynchronously) transmit their logs at different intervals, with differing transmission speeds, and may be received and processed by the corresponding devices of secondary data center 104B at different times. As a result, not all of the devices of secondary data center 104B may have received or processed the same log data at any given point in time.

To perform a takeover (in which secondary data center 104B takes over the responsibilities of primary data center 104A and receives and responds to client 110 requests), the devices of secondary data center 104B may need to be coordinated to a particular synchronization point 120. Replication coordinator 102 may select synch point 120 and coordinate the replication of devices to synch point 120 prior to takeover.

Replication coordinator 102 may periodically synchronize the various devices 106B, 108C, 108D of secondary data center 104B for takeover. In an embodiment, there may be multiple transactions being performed in parallel across the various devices of primary data center 104A. The transactions, for example, may be waiting, completed and not-committed, completed and committed, cancelled, or in progress. In an embodiment, logs 112A, 116A, 116B may include all the transactions in the various states. However, the transactions from logs 112A, 116A, 116B that are replicated on the devices of secondary data center 104B may only be those transactions that are completed or committed to one or more databases or other storage areas. Synch point 120 may indicate a particular state of primary data center 104A when a particular transaction or set of transactions were committed.

For example, a particular transaction may be occurring on both slave servers 108A and 108B. Master log 112A may indicate that the transaction is in progress. Slave server 108A may complete its portion of the transaction before slave server 108B completes its respective portion of the transaction. During that time interval (before slave server 108B completes its portion of the transaction), slave log 116A may indicate that the transaction is completed, not committed, while slave log 116B indicates that the corresponding portion of the transaction is in progress. At this stage, if logs 112A, 116A, 116B were transferred to secondary data center 104B, the transaction would not be replicated.

However, after slave server 106B completes its portion of the transaction, it may notify primary master server 106A. Primary master server 106A may then request slave servers 108A, 108B to commit the transaction and return an acknowledgement that the changed data has been committed to memory or other storage. When primary master server 106A receives the acknowledgement from slave servers 108A, 108B, master log 112A may be updated that the transaction was committed. Then, for example, the transaction may be available to be selected as synch point 120 (when the corresponding portion of master log 112B is received by secondary master server 106B).

In an embodiment, different slave servers 108A, 108B may track the transactions that are being performed or committed differently, with their own transaction naming or numbering schemes. For example, slave log 116A may track transactions by numbers (1, 3, . . . ) while slave log 116B may track transactions by letters (A, B, C, . . . ). In an embodiment, each slave 108 may utilize its own unique numbering, lettering, or naming convention as long as it satisfies a numbering policy that each subsequent transaction name is incrementally increased over the previous transaction name, such that an ordering between transactions can be identified. For example, slave log 116A may include transaction names 2, 4, 6, 8, while slave log 116E includes names 114, 117, 120, etc. As will be appreciated by those skilled in the relevant art(s), other embodiments may include other alphanumeric naming schemes and conventions.

In an embodiment, the local name of the transaction being committed according to the local naming convention may be returned as part of the acknowledgment message received from the various slave servers 108A, 108B. For example, for a particular transaction T10 (as identified by master log 112A), slave log 116A may record the corresponding transaction (or portion thereof) as "F" while slave log 116B records the corresponding transaction as "116." Then, for example, master log 112A may include the indication that transaction T10 corresponds to "F" on slave server 18A and "116" on slave server 108B. This information may be provided to secondary master server 016B as master log 112B (when transaction "T10" has been committed).

In an embodiment, secondary master server 106B may receive master log 112B from primary master server 106A. From the received master log 112B, replication coordinator 102 may select synch point 120. Synch point 120 may include a particular transaction identifier or timestamp that indicates that a most recently committed transaction for which the local transaction identifiers of slave servers 108A, 108B has been recorded.

In continuing the example above, replication coordinator 102 may receive master log 112B and select T10 as synch point 120. In an embodiment, replication coordinator 102 may query secondary slave servers 108C, 108D for their current log positions 111A, 111B to determine if current log positions 111 correspond to or exceed synch point 120. Current log position 111 may be an indication of a current or most recently received log position (from slave logs 116) received from primary data center 104A. In an embodiment, current log position 111 may be in the local naming or numbering scheme.

In an embodiment, replication coordinator 102 may transmit the transaction ("T10") synch point 120 (in the local naming scheme) to slave servers 108C, 108D ("F" and "116", respectively) and ask if slave server has received the corresponding slave logs 116A, 116B with the indicated synch point transaction 118. Slave severs 108C, 108D may then respond by setting a flag or returning a binary value, such as a true value if they have received the log from the corresponding primary slave server machine including the indicated synch point 120 transaction, or a false value if they have not yet received a slave log 116A, 116B with the indicated synch point 120 transaction.

If replication coordinator 102 determines or otherwise receives an indication that any of slave servers 1080, 108D has not yet received a corresponding slave log 116 up to the queried log position/synch point 120, then replication coordinator 102 may pause the replication process until the remaining slave server(s) 108C, 108D has received the log 116 with the indicated synch point 120.

In an embodiment, slave server 108D (which may be waiting to receive slave log 116E corresponding to synch point 120) may continue monitoring the received portions of slave log 116B to determine when synch point 120 transaction is received. Upon receiving the portion of log 116B that includes the synch point transaction 120, slave server 108D may send a message to or otherwise notify replication coordinator 102. In an embodiment, after a timeout period, replication coordinator 102 or slave server 108D may request a transmission or retransmission of log 116E from slave server 108B of primary data center 104A up to the synch point 120 (in the event the packet or previous transmission got lost or was never sent).

In an embodiment, if any of slave servers 108C, 108D crashes or restarts during operations, then upon being rebooted the restarted server may send a message to replication coordinator 102 indicating a current or most recently received slave log position. Upon restart, the slave sever 108C, 108D may not know whether or not replication coordinator 102 is waiting for a response or waiting for the slave server to receive a particular synch point 120 transaction log. Thus, without prompting by replication coordinator 102, slave servers 108C, 108D may automatically send this information to replication coordinator 102, which may then determine whether the slave server 108C, 108D has reached synch point 120. This may prevent resources from being wasted waiting for a response from slave server 108D, in case the synch point 120 transaction log was received and replication coordinator 120 was not notified (e.g., because of the crash or reboot).

In an embodiment, when replication coordinator 102 determines that all the slave servers 108C, 108D have received logs up to at least synch point 120, replication coordinator 102 may initiate a replay of the logs 116A, 116B by slave servers 108C, 108D up to synch point 120. In an embodiment, replication coordinator 102 may request an acknowledgement from each slave server 108C, 108D that the replay has been performed up to synch point 120. As the acknowledgements are received, master log 112B (and corresponding master data) may be updated.

Once replication coordinator 102 has confirmed that slave servers 108C, 108D have replayed the logs and are coordinated up to synch point 120, then replication coordinator 102 may set a flag or otherwise provide an indication that secondary data center 104B may be able to take over the operations or responsibilities of primary data center 104A from synch point 120. At the completion of replication process, secondary data center 104B may include the same data 114A, 118A, 118B on the same devices as shown in primary data center 104A, up to synch point 120. In an embodiment, if secondary data center 104B is not activated, replication coordinator 102 may then select a new synch point 120 and repeat the replication process described herein.

In an embodiment, primary master server 106A may include data tiering services (DTS) server 122A. DTS 122 may include storage management functionality or services being performed on or across one or more devices of each of the data centers 104. In the example of FIG. 1, DTS 122 is shown as being its own server or machine, however in other embodiments, different slave servers 106, 108 may include their own DTS 122 functionality.

DTS 122 may include storage management functionality that manages or enables a particular device 106, 108, to manage data storage between a memory and a disk storage space. Data being stored or accessed by any devices of the data centers 104 may be managed through DTS 122, regardless of whether the data is being stored locally on a particular device or is stored such that it is accessible by multiple devices simultaneously or in parallel (which may include other memory management functionality such as data locking and unlocking).

In an embodiment, two database management systems (DBMS), such as slave server 108A and slave server 108B, may have different metadata formats, transaction management, storage architecture and different methodologies for replication. If two such systems 108 are brought under a single integrated DBMS (e.g., primary master server 106A) to solve a given data management problem (such as a request from client 110), replication coordinator 102 may coordinate replication between the DBMS systems 108A, 108B.

Replication coordinator 102 may coordinate data center 104A replication, so that the database persistency of the integrated target system 104B is in sync with that of the integrated source system 104A. In a disaster situation or a planned shutdown of the primary system 104A, a takeover is issued on the target system 104B in order to provide high availability to the database applications. After such a takeover, the target system 104B as a whole (including any sub-systems, devices, or servers) must be transactionally consistent to synch point 120 and fully functional with all the data modifications available which were done by the user on the primary system prior to takeover.

DTS 122 may allow a system 104 (including servers or devices thereof) to optimize in-memory storage for storing and querying the hot data while leveraging on efficient storage and retrieval capabilities of disk storage for managing warm data (as described herein). DTS 122 may enable users, such as administrators, to create multi-store tables and extended tables. A multi-store table may include data partitions which can be hot or warm. The hot partitions may be stored in memory.

In an embodiment, DTS 122 may provide aging and anti-aging functionality to classify and move data partitions between the hot and warm stores. For example, how recently data has been accessed or modified may determine whether the data is classified as hot or warm/cold. Or, for example, particular data or tables may be classified as always-hot or always-warm, regardless of how recently it was accessed. The extended tables for warm data may be stored by DTS 122 or in disk storage. DTS 122A may enable data center 104A to seamlessly perform SQL (structured query language) queries, DML (data manipulation language) and DDL (data definition language) SQL operations on these multi-store and extended tables in the same way as if the data was not being managed by DTS 122A.

In an embodiment, slave data 118 may include the actual data, or pointers to memory or other storage locations where data values are stored. Slave data 118 may include data stored in volatile memory and/or other non-volatile storage locations. In an embodiment, volatile memory may include random access memory (RAM) and non-volatile storage may include a disk-based storage location. In an embodiment, master servers 106 may include their own version of master data (not shown) that may include data or other results that have been returned from one or more of the slave servers, and may operate in a similar manner as slave data 118 as described herein.

DTS 122 may be a data management service that manages storage space across one or more devices. For example, DTS 122 may evaluate, classify, and reclassify data 118 as being hot or cold/warm data. Hot data may include data that is frequently accessed or requested, or that has been recently accessed or requested. Cold data may include data that was previously accessed, and not anticipated to be accessed again or in the near future. In an embodiment, a particular user or administrator of a system can define the hot and cold data parameters that are executed by DTS 122, which may include but are not limited to a most recent time of data access, and/or an anticipated time for the next data access.

DTS 122 may manage data such that hot data remains accessible in memory, while cold data may be transferred to storage. Memory may be more limited in quantity but may enable faster access relative to storage. Storage may include devices or configurations with greater latencies and access times. For example, memory may include RAM while storage may include disk-based storage or storage across one more other remote devices or servers (such as a database server). Thus, to improve throughput and efficiently manage memory, DTS 122 may continually or periodically execute and manage the memory and storage, classifying and reclassifying data as being hot and cold data, and managing or coordinating data transfers between memory and storage locations.

In an embodiment, a transfer of data from memory to storage (or vice versa) may include updating logs 112A, 116A, 116B such that the logs indicate the new location of or pointer(s) to the corresponding data as performed based on DTS 122A. In an embodiment, each data transfer to/from memory/storage may be its own entry in a log. Or, for example, DTS 122A may locally maintain its own data transfer and management log indicating the classifications and/or transfers of data between storage and memory. In another embodiment, DTS 122A may create a second DTS log in each device for which data is being managed, which is transferred and replicated as described herein.

As described above, replication coordinator 102 may coordinate the replication of the devices of primary data center 104A onto the devices of secondary data center 104B. This replication may include coordinating and managing the replication of DTS 122 between the data centers 104. In an embodiment, DTS server 122A may be managed by primary master server 106A in a similar manner as described above with respect to slave servers 108A, 108B. As such, replication coordinator 102 may query DTS 122B to see if it has received and processed or replayed logs up to synch point 120 for a DTS log or functionality. As described above, the DTS functionality may be provided in its own DTS log and/or may include entries in logs 112A, 116A, 116B. As such, replication up to synch point 120 may include the replication of both data 118A, 118B and the classification or division of data between being hot/cold or being stored in memory or in storage. In an embodiment, DTS 122 may include its own local transaction naming or numbering scheme.

Replication coordinator 102 may ensure that the data classifications or partitions between hot/in-memory and warm/storage is transactionally consistent for replication and takeover. In an embodiment, replication of DTS 122A onto DTS 122B may include the transmission of log data (e.g., point-in-time recovery logs) using the same underlying system of replication used between primary master server 106A and secondary master server 106B.

Figure 2A:
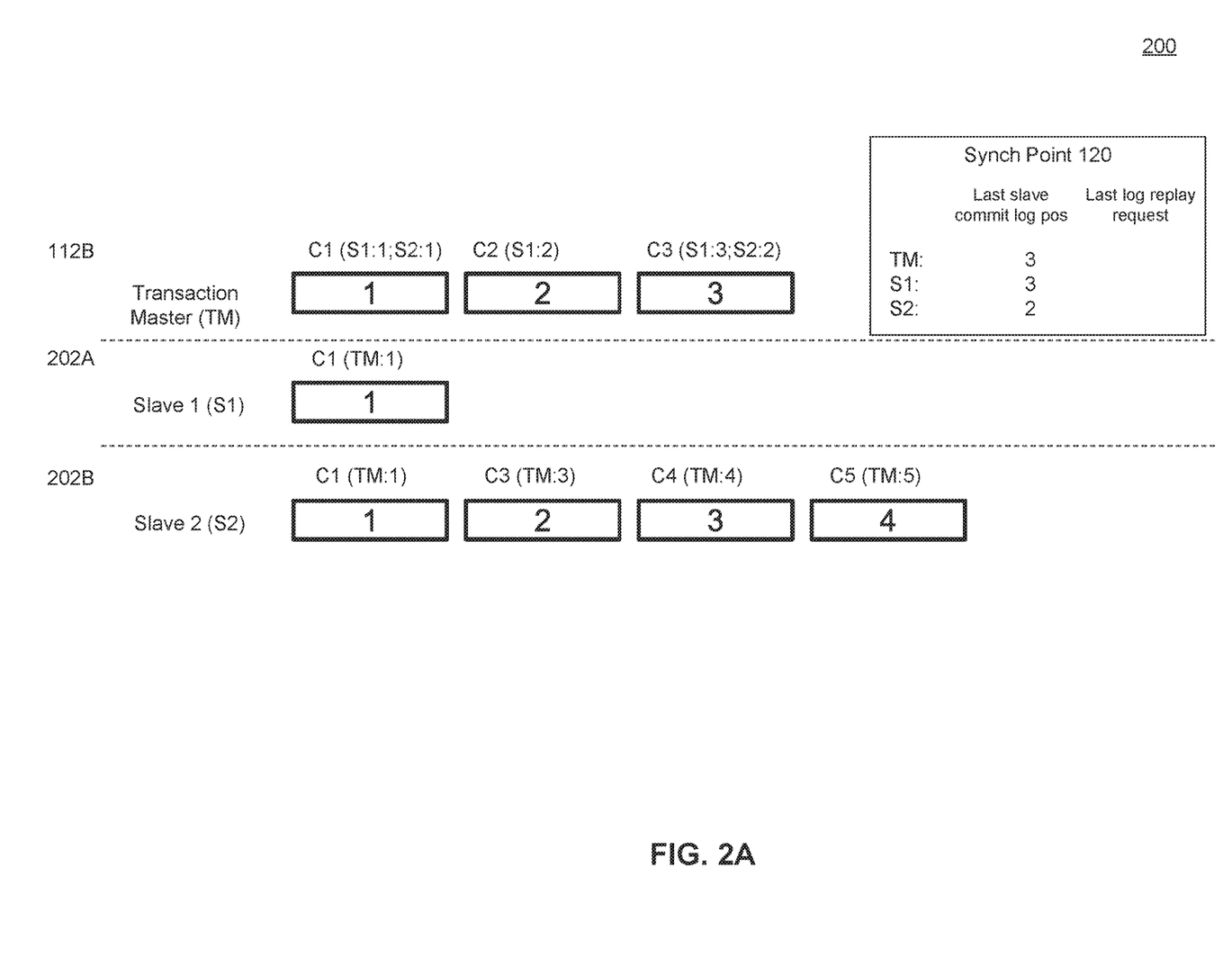
FIGS. 2A and 2B illustrate example operations of coordinated replication of heterogeneous database stores, according to some embodiments.
Figure 2B:
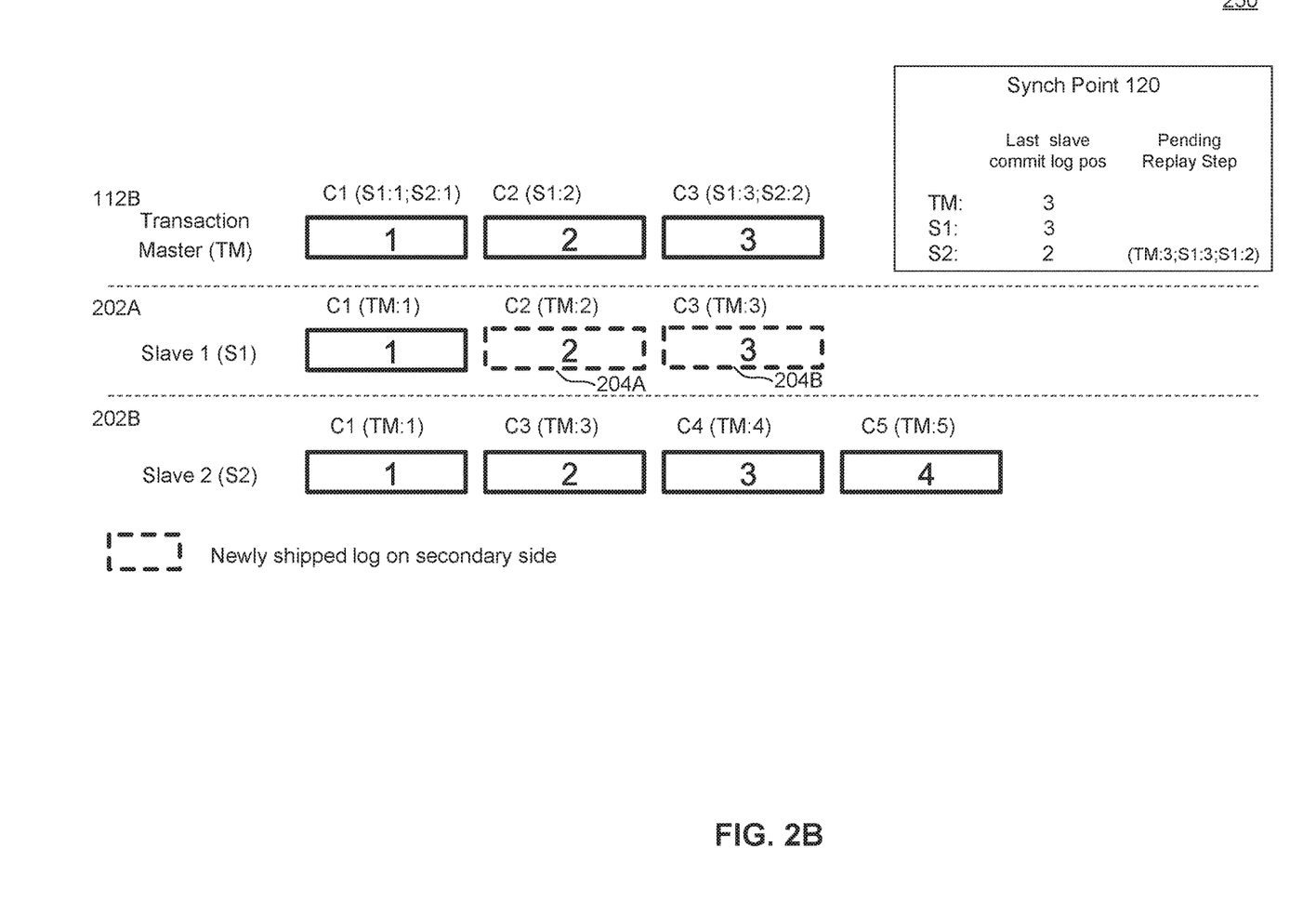

FIGS. 2A and 2B illustrate example operations of coordinated replication of heterogeneous database stores, according to some embodiments. In FIG. 2A, master log 112B as received by secondary master server 106B may indicate 3 transactions that were committed. Master log 112B may indicate the name of the transactions across the logs 202A, 202B of the slave servers 108, 122. For example, transaction C1 may correspond to transaction "1" on both slave 1 and slave 2. However, in another example, C1 may correspond to transaction "1" on slave 1, and transaction "AA" on slave 2. In an embodiment, logs 202 may include logs for any slave serve 108, including DTS 122 as shown in FIG. 1.

In the example shown, synch point 120 may be chosen as transaction 3 (C3) from log 11213. Transaction "3" may correspond to transaction "3" on slave 1, and transaction "2" on slave 2. In response to a log receipt or positioning query, slave 2 may respond with a true message that it has received logs up to (and beyond) synch point 120, corresponding to transaction 2. As may be seen in the example, slave 2 has received slave logs up to transaction 4. Slave 1, by contrast, may respond with a false or other indication that it has not yet received transactions up to transaction 3 (according to slave 1's local naming convention). As shown in the example, slave 1 only received logs including transaction "1." As such, replication coordinator 102 may wait to initiate log replays until it receives an indication that slave 1 has received slave logs up to at least transaction 3.

In FIG. 2B, slave 1 may have received one or more slave logs up to transaction 3, as shown by new entries 204A, 204B. Upon receiving an indication that slave 1 has reached synch point 120, replication coordinator 102 may initiate a replay or otherwise request secondary master server 106B and the corresponding slave servers 108,122 to replay the log positions up to synch point 120. When replication coordinator receives an indication that the replay has completed across all the devices up to synch point 120, secondary data center 104B may be enabled or activated to take over for primary data center 104A.

Figure 3:
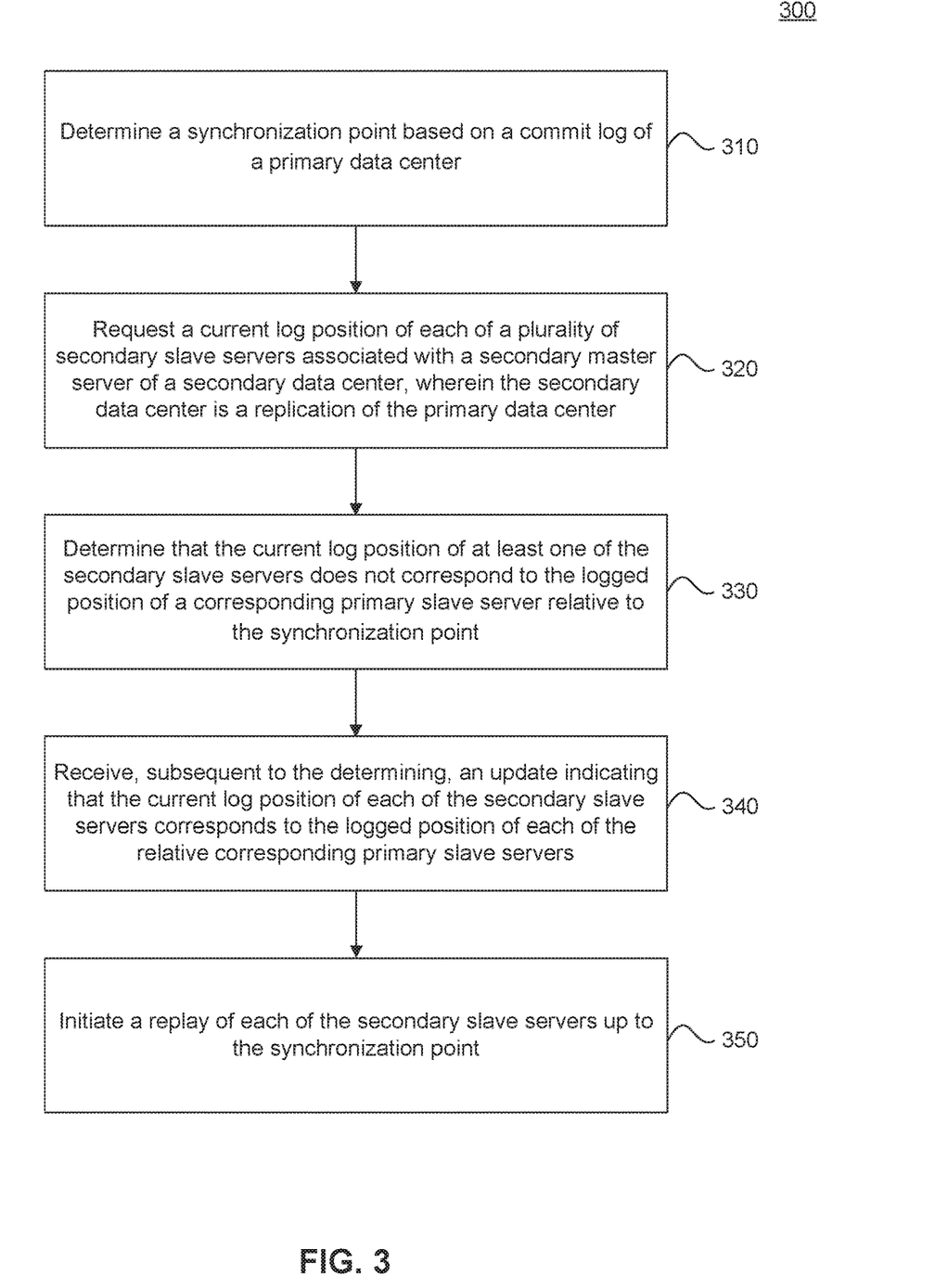
FIG. 3 is a flowchart illustrating a process for coordinated replication of heterogeneous database stores, according to some embodiments.

FIG. 3 is a flowchart for a method 300 for message handling related to non-parallelizable functionality, according to an embodiment. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art. Method 300 shall be described with reference to FIGS. 1, 2A, and 2B. However, method 300 is not limited to the example embodiments.

In 310, a synchronization point is determined based on a commit log of a primary data center. For example, replication coordinator 102 may determine synch point 120 from master log 112B received from primary master server 106A. Synch point 120, as shown in the example of FIG. 2A, may correspond to a logged position or committed transaction of log 112A. Synch point 120 may indicate a transaction identifier corresponding to one or more slave servers 108A, 108B as indicated in slave logs 116A, 116B.

In an embodiment, a portion of master log 112A may be selected to be provided to secondary master server 106B based on an amount of data, a number of transactions, a passage of time period or other indicators. Synch point 120 may be the most recent (latest) commit that has been confirmed and acknowledged by each of the slave servers 108A, 108B of primary data center 104A as determined from the received master log data 112B. In an embodiment, during the coordination of replay by replication coordinator 102, replication coordinator 102 may cause or instruct primary data center 104A to pause processing any additional requests from clients. In an embodiment, the suspended operations of data center 104A may be requested as part of a takeover request from synch point 120.

In 320, a current log position of each of a plurality of secondary slave servers associated with a secondary master server of a secondary data center is requested. For example, replication coordinator 102 may request the current log position 111A, 111B of each slave server 108C, 108D. This may include requesting a transaction identifier or status from a log of DTS 122B.

In 330, it is determined that the current log position of at least one of the secondary slave servers does not correspond to the logged position of a corresponding primary slave server relative to the synchronization point. For example, as shown in FIG. 2A, the current log position of slave 1 of "1" does not correspond to the synch point 120 position of "3" for slave 1.

In an embodiment, if all of the slave servers involved in the replication process have not yet received the log data up to at least the synch point 120, replication coordinator 102 may wait until an update is received from the remaining slave servers indicating that the log data up to or beyond synch 120 has been received. If, however, all the log data up to synch point 120 has been received, replication coordinator may initiate a replay of the logs (updating the data) up to synch point 120.

In 340, an update indicating that the current log position of each of the secondary slave servers corresponds to the logged position of each of the relative corresponding primary slave servers is received. For example, as shown in FIG. 2B, slave 1 may provide an indication that it has receive logs up to (or beyond) the synch point 120. This indication may be received and processed by replication coordinator 102.

In 350, a replay of each of the secondary slave servers up to the synchronization point is initiated. For example, upon receiving a current log position 111 from each slave server 108C, 108D, 122B that meets or exceeds synch point 120, replication coordinator 102 may initiate a replay of the logs up to synch point. The replay may include a classification or organization of the data and memory management as performed by DTS 122B. Upon completing the replication up to synch point 120, secondary data center 104B may be enabled or activated to begin receiving and processing client 110 requests, to take over for primary data center 104A in the event of a failure.

In an embodiment, replication coordinator 102 may provide for fault-tolerant replication and takeover. For example, if replication coordinator 102 detects a failure at any stage during log replay in any sub-system, replication coordinator 102 may abort the current replay and signal the devices of data center 104B to roll back the system to previously stable state or synch point 120 prior to committing the replay. The previous synch point 120 may be the initialized state of data center 104B, or any previous synch point 120 for which replication was performed. Data center 104B may then resume normal operations from the rolled back synch point 120.

Figure 4:
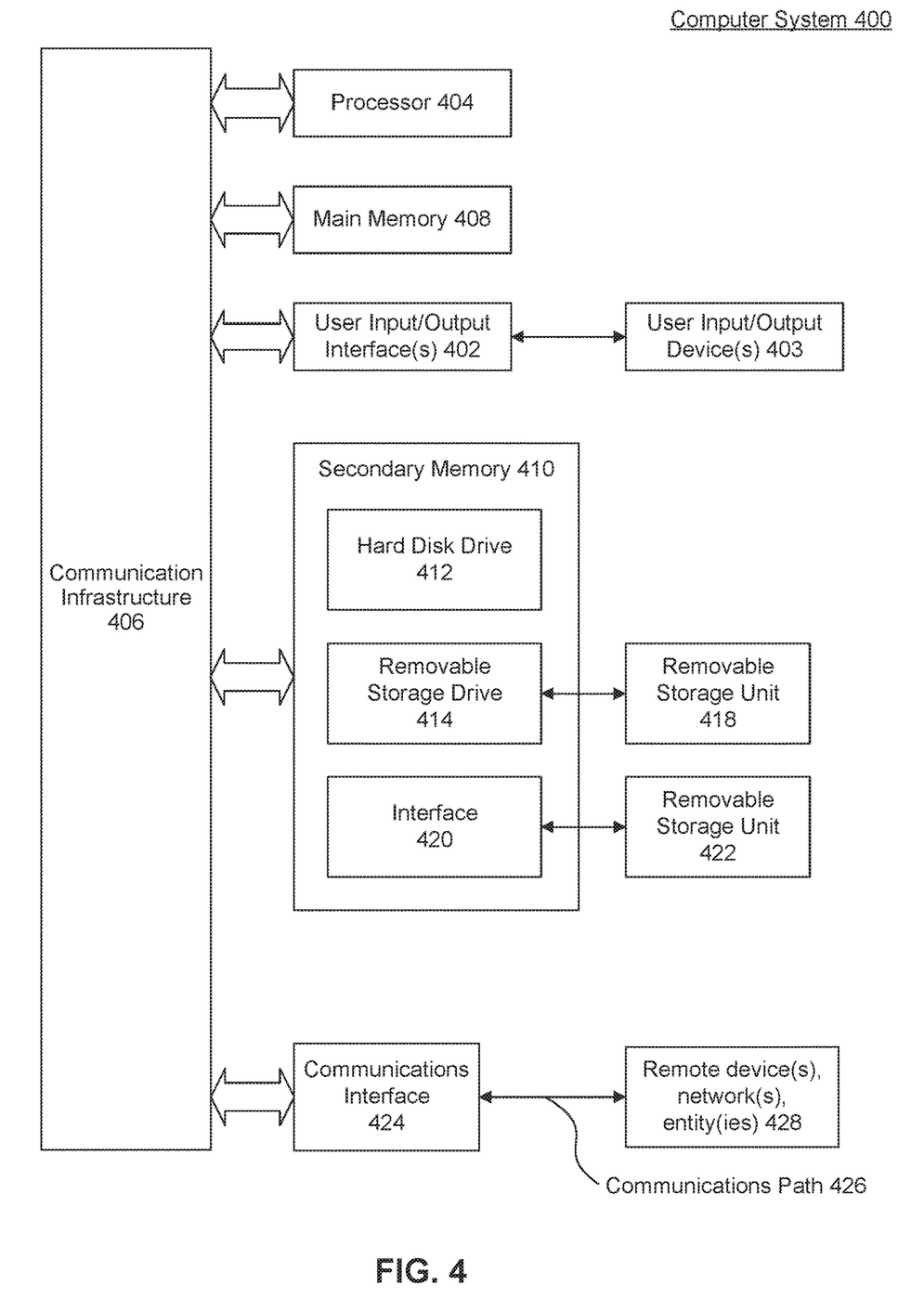
FIG. 4 is an example computer system useful for implementing various embodiments.

Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include user input/output device(s) 403, such as monitors, keyboards, pointing devices, etc., which may communicate with communication infrastructure 406 through user input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (Paas), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), Message hack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims, Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method, comprising:
    receiving, at a replication coordinator, a commit log of a primary data center, wherein the primary data center comprises a primary master server and a plurality of primary slave servers configured to perform transactions that are then transmitted back to the primary master server;
    selecting a synchronization point from the commit log, wherein the synchronization point corresponds to a log position in a slave log of each of the plurality of primary slave servers, wherein each primary slave server uses its own naming convention in its own slave log that identifies and tracks the transactions processed by a respective primary slave server, wherein at least two of the naming conventions differ from each other;
    translating the synchronization point for each of the naming conventions corresponding to each of the slave logs of the primary slave servers;
    requesting a current log position of each of a plurality of secondary slave servers associated with a secondary master server of a secondary data center, wherein the request comprises the translated synchronization point in a local naming convention for a respective primary slave server to which the request is provided, wherein each of the secondary slave servers corresponds to a replication of one of the primary slave servers with its corresponding naming convention, and wherein the secondary master server comprises a replication of the primary master server;
    receiving a response to the request from one or more of the primary slave servers;
    determining, based on the response, that the current log position of at least one of the secondary slave servers does not correspond to the synchronization point;
    receiving, subsequent to the determining, an update indicating that the current log position of each of the secondary slave servers corresponds to the synchronization point; and
    initiating a replay of each of the secondary slave servers up to the synchronization point.

2. The computer-implemented method of claim 1, wherein the selecting the synchronization point comprises:
    determining, based on one or more commit logs corresponding to each of the primary slave servers, a most recent commit point, wherein the most recent commit point corresponds to a most recent point in time up to which each of the primary slave servers has committed a database change.

3. The computer-implemented of claim 1, wherein
    the determining that the current log position of at least one of the secondary slave servers does not correspond to the synchronization point comprises requesting, from each of the secondary slave servers, the current log position; and
    wherein the requesting the current log position comprises requesting an update from each of the secondary slave servers indicating when the current log position corresponds to the synchronization point.

4. The computer-implemented method of claim 1, wherein the receiving the update comprises:
    determining that the current log position of each of the secondary slave servers meets or exceeds the log position corresponding to the synchronization point.

5. The computer-implemented method of claim 1, further comprising:
    initiating a takeover, wherein the secondary master server operates as the primary master server and the primary master server is inoperable as the primary master server.

6. The computer-implemented method of claim 1, wherein the initiating the replay further comprises:
    determining that a particular one of the primary or secondary slave servers classifies data as being either hot data or cold data, wherein the hot data is stored in memory and wherein the cold data is stored in non-memory storage; and
    determining that the classified data of the particular one of the primary or secondary slave servers have been replicated.

7. The computer-implemented method of claim 1, wherein a first primary slave server is associated with a first metadata format, and wherein a second primary slave server is associated with a secondary metadata format different the first metadata format.

8. The computer-implemented method of claim 1, further comprising:
    detecting that an error occurred during the replay;
    determining a previous synchronization point of the secondary data center; and initiating a rollback of the replay to the previous synchronization point based on the detecting.

9. The computer-implemented method of claim 1, further comprising:
pausing a replication process of at least one of the secondary slave servers of the secondary data center until the update is received.

10. The computer-implemented method of claim 1, wherein the response comprises a Boolean indicating whether or not a transaction corresponding to the synchronization point has been completed by a corresponding primary slave server.

11. A system, comprising:
a memory; and
at least one processor coupled to the memory and configured to:
receive, at a replication coordinator, a commit log of a primary data center, wherein the primary data center comprises a primary master server and a plurality of primary slave servers configured to perform transactions that are then transmitted back to the primary master server;
select a synchronization point from the commit log, wherein the synchronization point corresponds to a log position in a slave log of each of the plurality of primary slave servers, wherein each primary slave server uses its own naming convention in its own slave log that identifies and tracks the transactions processed by a respective primary slave server, wherein at least two of the naming conventions differ from each other;
translate the synchronization point for each of the naming conventions corresponding to each of the slave logs of the primary slave servers;
request a current log position of each of a plurality of secondary slave servers associated with a secondary master server of a secondary data center, wherein the request comprises the translated synchronization point in a local naming convention for a respective primary slave server to which the request is provided, wherein each of the secondary slave servers corresponds to a replication of one of the primary slave servers with its corresponding naming convention, and wherein the secondary master server comprises a replication of the primary master server;
receive a response to the request from one or more of the primary slave servers;
determine, based on the response, that the current log position of at least one of the secondary slave servers does not correspond to the synchronization point;
receive, subsequent to the determining, an update indicating that the current log position of each of the secondary slave servers corresponds to the synchronization point; and
initiate a replay of each of the secondary slave servers up to the synchronization point.

12. The system of claim 11, wherein the processor that selects the synchronization point is configured to:
determine, based on one or more commit logs corresponding to each of the primary slave servers, a most recent commit point, wherein the most recent commit point corresponds to a most recent point in time up to which each of the primary slave servers has committed a database change.

13. The system of claim 11, wherein
the processor that determines that the current log position of at least one of the secondary slave servers does not correspond to the synchronization point is configured to request, from each of the secondary slave servers, the current log position; and
wherein the processor that requests the current log position is configured to request, from each of the secondary slave servers, an update indicating when the current log position corresponds to the synchronization point.

14. The system of claim 11, wherein the processor that receives the update is configured to:
determine that the current log position of each of the secondary slave servers meets or exceeds the log position corresponding to the synchronization point.

15. The system of claim 11, wherein the at least one processor is further configured to:
initiate a takeover, wherein the secondary master server operates as the primary master server and the primary master server is inoperable as the primary master server.

16. The system of claim 11, wherein the processor that initiates the replay is further configured to:
determine that a particular one of the primary or secondary slave servers classifies data as being either hot data or cold data, wherein the hot data is stored in memory and wherein the cold data is stored in non-memory storage; and
determine that the classified data of the particular one of the primary or secondary slave servers have been replicated.

17. The system of claim 11, wherein a first primary slave serve r is associated with a first metadata format, and wherein a second primary slave server is associated with a secondary metadata format different the first metadata format.

18. The system of claim 11, wherein the at least one processor is further configured to:
detect that an error occurred during the replay;
determine a previous synchronization point of the secondary data center; and initiate a rollback of the replay to the previous synchronization point based on the detecting.

19. A non-transitory computer-readable device having instructions stored thereon that, when executed by at least one computing device, cause the at least one computing device to perform operations comprising:
selecting, by a replication coordinator, a synchronization point based on a commit log of a primary data center, wherein the primary data center comprises a primary master server, and wherein the synchronization point corresponds to a logged position for each of a plurality of primary slave servers using their own naming conventions that identify and track transactions processed by a respective slave server, wherein at least two of the naming conventions differ from each other;
translating the synchronization point for each of the naming conventions corresponding to each of the slave logs of the primary slave servers;
requesting a current log position of each of a plurality of secondary slave servers associated with a secondary master server of a secondary data center, wherein the request comprises the translated synchronization point in a local naming convention for a respective primary slave server to which the request is provided, wherein each of the secondary slave servers corresponds to a replication of one of the primary slave servers with its corresponding naming convention, and wherein the secondary master server comprises a replication of the primary master server;

receiving a response to the request from one or more of the primary slave servers;

determining, based on the response, that the current log position of at least one of the secondary slave servers does not correspond to the synchronization point;

receiving, subsequent to the determining, an update indicating that the current log position of each of the secondary slave servers corresponds to the synchronization point; and initiating a replay of each of the secondary slave servers up to the synchronization point.

20. The non-transitory computer-readable device of claim 19, wherein the selecting the synchronization point comprises:

determining, based on one or more commit logs corresponding to each of the primary slave servers, a most recent commit point, wherein the most recent commit point corresponds to a most recent point in time up to which each of the primary slave servers has committed a database change.

* * * * *